No. 828,748. PATENTED AUG. 14, 1906.
W. A. KLINGBERG.
TRACTION ATTACHMENT FOR DRIVE WHEELS.
APPLICATION FILED DEC. 30, 1905.
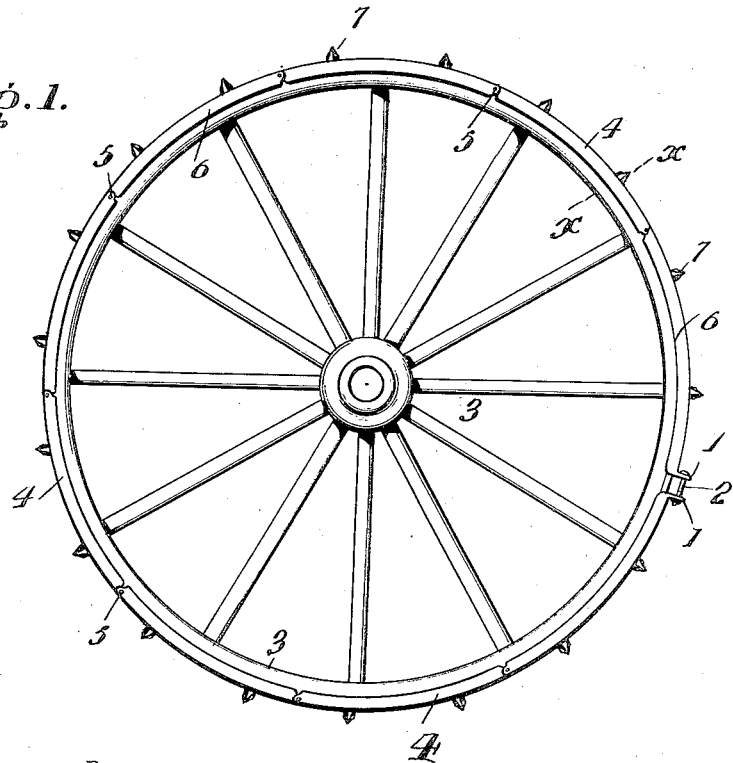
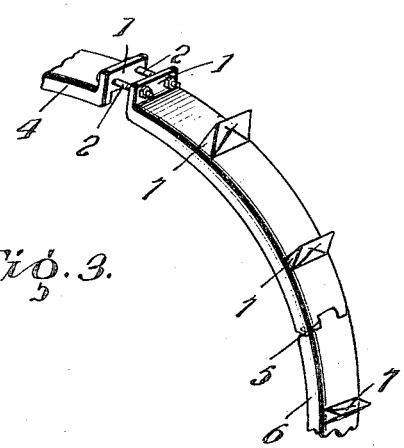
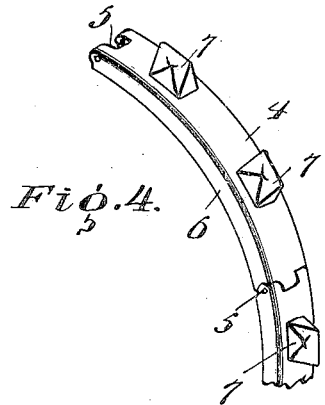
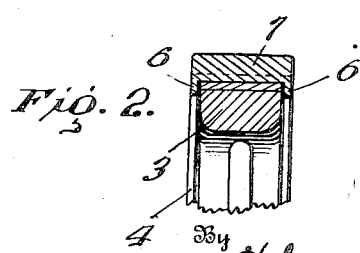

UNITED STATES PATENT OFFICE.

WILLIAM A. KLINGBERG, OF ELMO, KANSAS.

TRACTION ATTACHMENT FOR DRIVE-WHEELS.

No. 828,748.    Specification of Letters Patent.    Patented Aug. 14, 1906.

Application filed December 30, 1905. Serial No. 293,976.

*To all whom it may concern:*

Be it known that I, WILLIAM A. KLINGBERG, a citizen of the United States, residing at Elmo, in the county of Dickinson and State of Kansas, have invented certain new and useful Improvements in Traction Attachments for Drive-Wheels, of which the following is a specification.

This invention has for its object chiefly to provide a band to be fitted to the rim or tire of a mechanically-propelled vehicle to obviate slipping, as well as increase the tread-surface, thereby preventing sinking of the wheel into the ground in the event of the machine being propelled over a yielding surface, such as wet and soggy ground.

A further purpose of the invention is the provision of a device which may be readily applied to the traction or drive wheel of a mechanically-propelled vehicle or removed therefrom, as occasion may demand, and which when not required for immediate service may be folded into compact form, so as to occupy a minimum amount of space and not be in the way, and which may be conveniently stored upon the vehicle, so as to be readily accessible and at hand for use should the exigencies of the case demand the application of the appliance.

The invention consists, essentially, of a band composed of sections or links connected in a way to admit of the band being readily folded into a small compass, the sections or links being provided with spurs, cogs, or projections to enter the surface to a depth to insure positive rotation of the wheel and prevent slipping thereof when the attachment is properly fitted thereto.

For a full description of the invention and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side view of a drive-wheel equipped with a traction-band constructed in accordance with the invention. Fig. 2 is a transverse section of the rim portion of the wheel and attachment on the line x x of Fig. 1, the parts being illustrated on a larger scale. Fig. 3 is a detail perspective view of a portion of the traction band or attachment. Fig. 4 is a detail view of a modification.

Corresponding and like parts are referred to in the following description and indicated in all the views of the drawings by the same reference characters.

The attachment is provided in the shape of a band which is composed of sections or links pivotally connected in any way to admit of the band being folded into a compact form, so as to be conveniently stored upon the machine, engine, or vehicle, so as to be out of the way. The sections or links are curved to conform to the circumference of the wheel for which the attachment is designed. There may be as many sections or links in the band as found most advantageous in manufacture and use.

The terminal sections of the band have their outer ends provided with offstanding flanges or projecting parts 1, which are apertured to receive bolts or like fastenings 2, by means of which the extremities of the band are united and drawn together to cause said band to conform to and snugly embrace the tire or tread portion of the wheel 3 to which the attachment may be applied.

The sections or links 4, comprising the band or attachment, are preferably longitudinally curved and are provided in number sufficient to encircle the tire or rim of the wheel with the exception of a slight space between the terminal sections to provide for proper tightening of the band when applied to the wheel so as to obviate slipping of the attachment thereon. The links or sections are jointed, as shown at 5, any suitable means being employed for connecting the parts to admit of their free articulation, so as to enable the band to be reduced to a compact form when not required for immediate use. A flange 6 is provided at each side of a section or link to extend along the side of the rim or tire of the wheel 3 to prevent lateral displacement of said tire when in position, the flanges 6 being spaced apart a distance corresponding to the transverse width of the tire or rim of the traction or other wheel to which the attachment may be applied. One or more spurs, cogs, or projections 7 project outward from each section or link and constitute teeth to penetrate the surface so as to obviate slipping of the wheel when passing over wet, soggy, or meadow land or over a muddy road. The base of the teeth or projections is approximately of rectangular form, and said teeth slope equally from opposite ends and sides to an edge, which latter readily penetrates the surface, thereby offering a minimum amount of resistance to the rotation of the wheel. The peculiar form of the teeth results in a substantial structure and enables the said teeth to resist great strain and becoming detached from the band or becoming otherwise disabled when meeting with stones or other hard and unyielding objects or surface. The teeth or projections of the band designed to be applied to the driving-wheels have a transverse arrangement, whereas the teeth applied to the pilot or steering wheels are disposed in the plane of the wheel or length of the band so as to obviate lateral displacement or skidding of the machine when passing around a curve at a comparatively high rate of speed.

It is to be understood that the bands are provided in different lengths and widths according to different diameters of wheels and according to the nature of the surface over which the machine or vehicle is to be propelled. In this connection it is to be understood that bands of uniform length may be provided in different widths, so as to increase the transverse extent of the drive-wheel, and thereby prevent sinking of the same into a muddy or other soft surface.

The longitudinal flanges 6, in addition to preventing lateral displacement of the sections when the band is fitted upon a wheel, also provide stiffening means for the sections and being apertured to receive the pivot-fastening 5 sustain the circumferential strain when the band is drawn about the wheel by means of the fastenings 2. The sections are of like formation and are interchangeable and are preferably rigid, the curvature conforming to a section of a circle corresponding to a wheel of given or standard size. Should any section become unfitted for further effective service from any cause, it may be readily replaced from stock. Hence the advantage of having all of the sections of a band of like size and corresponding construction.

Having thus described the invention, what is claimed as new is—

A traction-band for vehicle-wheels, the same composed of sections of like formation and size, each section being longitudinally curved and provided with outer teeth upon its tread and having flanges at its longitudinal edges to brace and strengthen the section and to embrace opposite sides of the tire of the wheel to which the attachment is fitted, said longitudinal flanges being apertured near their ends to receive pivot-fastenings, the terminal sections of the band having outwardly-extended flanges which are apertured to receive fastenings for securing the band and tightening the same about the wheel to which it may be fitted.

In testimony whereof I affix my signature in presence of two witnesses.

WILLIAM A. KLINGBERG. [L. S.]

Witnesses:
J. E. GLEASON,
ELMER SHANE.